United States Patent
Mora et al.

(10) Patent No.: US 8,619,127 B2
(45) Date of Patent: Dec. 31, 2013

(54) STEREOSCOPIC THREE DIMENSIONAL VISUALIZATION SYSTEM AND METHOD OF USE

(76) Inventors: Assad F. Mora, Santa Barbara, CA (US); Art H. Hardy, Bakersfield, CA (US); Kitchener Clark Wilson, Santa Barbara, CA (US)

( * ) Notice: Subject to any disclaimer, the term of this patent is extended or adjusted under 35 U.S.C. 154(b) by 1219 days.

(21) Appl. No.: 12/119,027

(22) Filed: May 12, 2008

(65) Prior Publication Data

US 2008/0278571 A1   Nov. 13, 2008

Related U.S. Application Data

(60) Provisional application No. 60/928,597, filed on May 10, 2007.

(51) Int. Cl.
*H04N 13/02* (2006.01)

(52) U.S. Cl.
USPC ............................................. 348/48; 348/36

(58) Field of Classification Search
USPC .................... 348/42, 48, 47, 51, 52
See application file for complete search history.

(56) References Cited

U.S. PATENT DOCUMENTS

| | | | |
|---|---|---|---|
| 4,035,057 A | 7/1977 | Klein | |
| 4,167,302 A | 9/1979 | Karasawa | |
| 4,170,336 A | 10/1979 | Malis | |
| 4,281,341 A | 7/1981 | Byatt | |
| 4,395,731 A | 7/1983 | Schoolman | |
| 5,867,210 A | 2/1999 | Rod | |
| 5,976,071 A | 11/1999 | Sekiya | |
| 6,057,878 A | 5/2000 | Ogiwara et al. | |
| 6,141,034 A * | 10/2000 | McCutchen | 348/36 |
| 6,304,286 B1 | 10/2001 | Shirai et al. | |
| 6,414,708 B1 | 7/2002 | Carmeli et al. | |
| 6,982,827 B2 | 1/2006 | Mora | |
| 7,107,090 B2 | 9/2006 | Salisbury, Jr. et al. | |
| 2002/0167726 A1 | 11/2002 | Barman et al. | |
| 2003/0220541 A1 | 11/2003 | Salisbury, Jr. et al. | |
| 2006/0001740 A1 | 1/2006 | Fujie et al. | |
| 2006/0103723 A1 | 5/2006 | Scire, Jr. | |
| 2006/0109202 A1 * | 5/2006 | Alden | 345/32 |
| 2007/0049794 A1 * | 3/2007 | Glassenberg et al. | 600/109 |
| 2007/0058035 A9 | 3/2007 | Fujie et al. | |
| 2007/0058249 A1 | 3/2007 | Hirose et al. | |

FOREIGN PATENT DOCUMENTS

| | | |
|---|---|---|
| DE | 24 40 957 | 3/1984 |
| EP | 1 037 085 | 9/2000 |
| EP | 1 420 280 | 5/2004 |
| EP | 1 763 258 | 3/2007 |

(Continued)

OTHER PUBLICATIONS

International Search Report and Written Opinion in corresponding International Application No. PCT/US2008/063398, dated Nov. 5, 2008.

*Primary Examiner* — Barbara Burgess
(74) *Attorney, Agent, or Firm* — Faegre Baker Daniels LLP

(57) ABSTRACT

The present invention relates to a stereoscopic three dimensional visualization system, and particularly to a stereoscopic three dimensional visualization system for microdentistry, microsurgery, or industrial applications. In one exemplary embodiment, the present invention provides a plurality of cameras configured to provide a first stereoscopic image to a dentist or other professional and a second stereoscopic image to an assistant that has approximately the same focal point, but that is rotated by a predetermined angle from the first stereoscopic image. In one exemplary embodiment three cameras are utilized to create the stereoscopic images.

14 Claims, 13 Drawing Sheets

(56) References Cited

FOREIGN PATENT DOCUMENTS

| EP | 1 901 564 | 3/2008 |
|---|---|---|
| JP | 2006-262397 | 9/2006 |
| WO | 02/44808 | 6/2002 |
| WO | 03/054625 | 7/2003 |
| WO | 2005/073801 | 8/2005 |

* cited by examiner

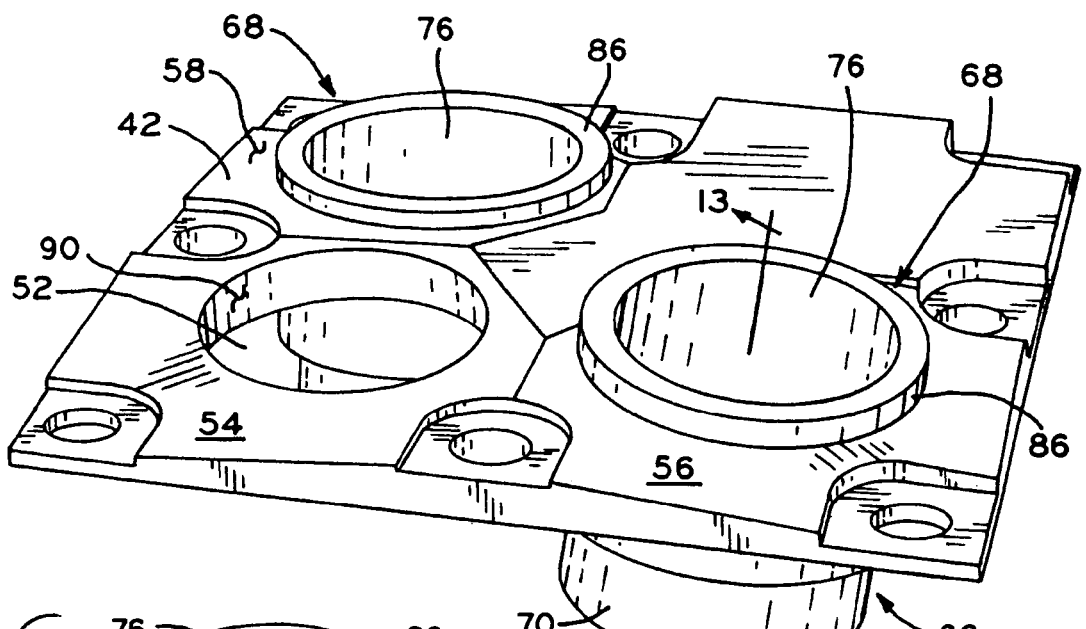
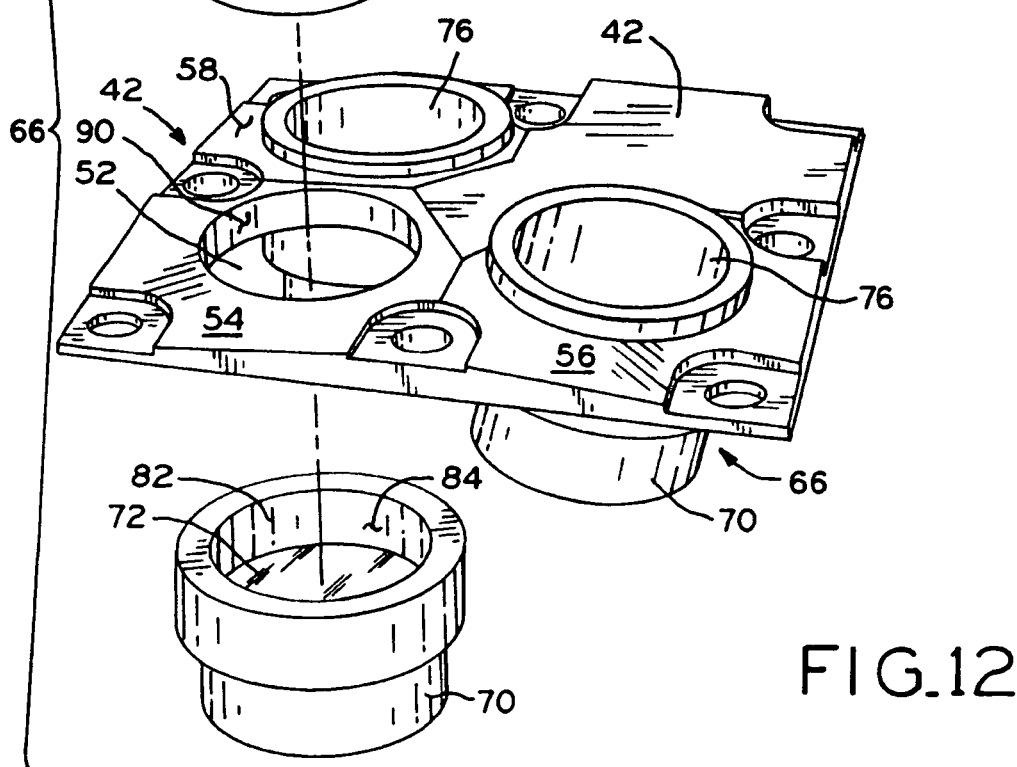

FIG_19

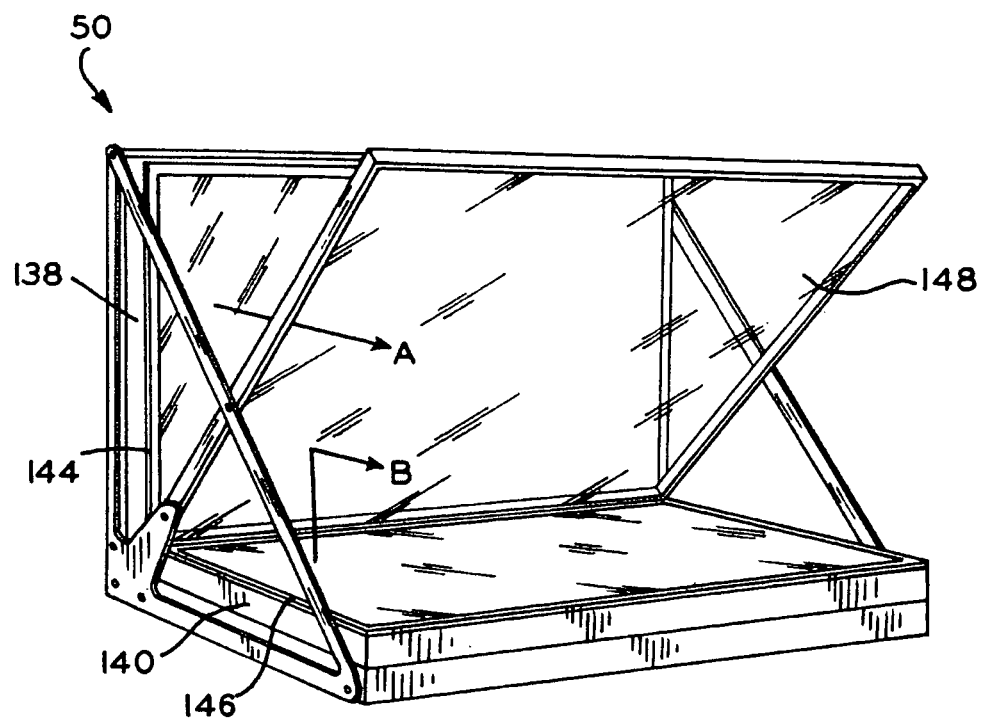
FIG_21
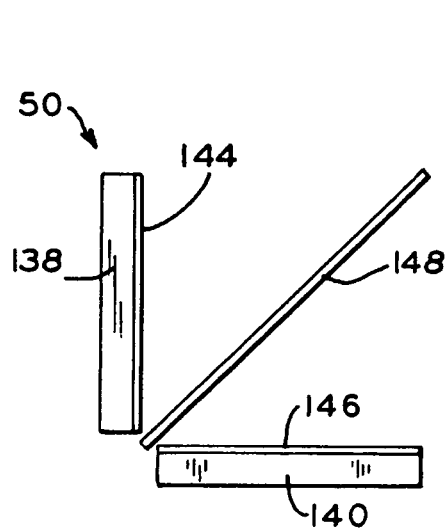
FIG_22
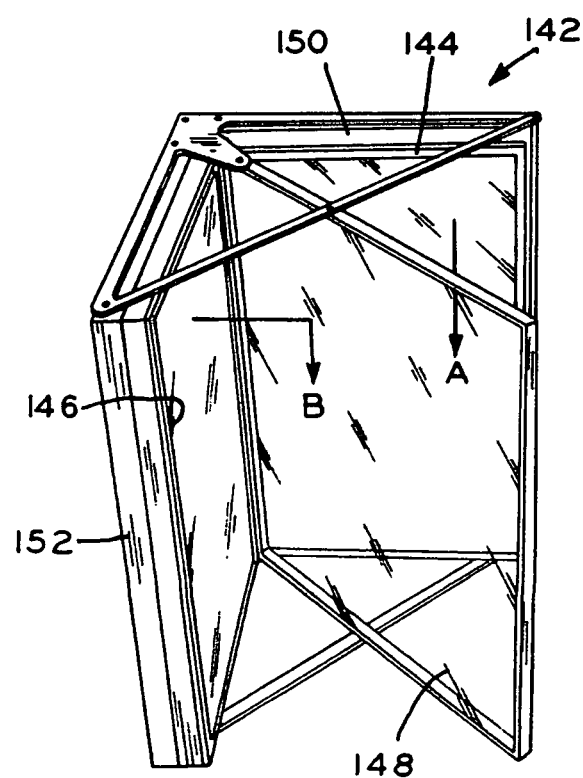
FIG_24

STEREOSCOPIC THREE DIMENSIONAL VISUALIZATION SYSTEM AND METHOD OF USE

CROSS-REFERENCE TO RELATED APPLICATIONS

This application claims the benefit under Title 35 U.S.C. §119(e) of U.S. Provisional Patent Application Ser. No. 60/928,597, entitled STEREOSCOPIC THREE DIMENSIONAL VISUALIZATION SYSTEM AND METHOD OF USE, filed on May 10, 2007, the entire disclosure of which is expressly incorporated by reference herein.

BACKGROUND

1. Field of the Invention

The present invention relates to a stereoscopic three dimensional visualization system, and, particularly, to a stereoscopic three dimensional visualization system for dentistry, surgery, or industrial applications.

2. Description of the Related Art

Chronic back and neck pain is a common ailment experienced by dentists as a result of their work environment. In order to see into the oral cavity, dentists generally sit above the head of a patient who is placed in a reclined position. For example, a dentist may sit along the right side of a patient adjacent to his/her head, e.g., at an eight, nine, or ten o'clock position, to view objects within the patient's oral cavity. However, even in this position, a dentist must lean and crane to obtain the necessary view of the oral cavity. Due to the repetitive leaning and craning, chronic back and neck pain may result.

In an attempt to help reduce the constant leaning and craning of a dentist, surgical type microscopes have been adapted for use in dentistry. While these microscopes provide magnification of the oral cavity, these microscopes still require that a dentist look into the ocular unit in order to view the image of the oral cavity generated by the microscope. Additionally, the ocular unit of the microscope is generally positioned on a tubular body that is mounted to an articulating stand. Thus, in order to view the oral cavity of a patient through the ocular unit, the dentist must position his/her head substantially adjacent to the ocular unit, which may require the same leaning and craning as viewing the oral cavity unassisted.

Microscope systems have traditionally provided an assistant's co-observation tube as an option. While the use of a co-observation tube might be helpful in providing the assistant with the same magnified field of view as that of the dentist, any microscope movement requires that the assistant correspondingly moves his/her head to maintain visual contact with the operating field. Frequently, the co-observation tube might be moved by the dentist in a manner that makes it difficult for the assistant to accommodate with normal working posture, without the interruption for adjusting and repositioning the co-observation tube. Moreover, even if the image generated for the assistant is optically rotated to provide the correct perspective, the depth of the assistant's stereoscopic optical image may be artificially shallow as a result of splitting only a single beam of the stereoscopic light path to generate the assistant's image.

In an attempt to eliminate the need for the dentist to view the images created by the microscope through an ocular unit, three dimensional ("3-D") stereoscopic video has been utilized. These systems allow the dentist to project the image created by the microscope onto a screen positioned in front of the dentist. The dentist's movements may then be based on the image created on the screen. As a result, the dentist's view is no longer posture dependent, i.e., is no longer dictated by the design of the microscope. However, the current 3-D units are configured to attach to the tubular unit, i.e., the body, of a surgical microscope and simply transmit the image received therethrough.

As a result, the 3-D units are limited by the microscope design in their image generation, flexibility, and size. For example, in order to provide an image for an assistant seated at an angle of approximately 90° relative to the dentist, the image created by the 3-D video system is simply spliced and fed to a second projector or monitor. Thus, the assistant must work in the oral cavity utilizing a generated stereoscopic image that provides an incorrect perspective for the assistant which is rotated approximately 90° relative to the assistant's viewing position.

SUMMARY

The present invention relates to a stereoscopic three dimensional visualization system, and particularly to a stereoscopic three dimensional visualization system for dentistry, surgery, or industrial applications. In one exemplary embodiment, the present invention provides a plurality of cameras configured to provide a first stereoscopic image to a dentist or other professional and a second stereoscopic image for the assistant that has approximately the same focal point, but that is rotated by a predetermined angle from the first stereoscopic image. In one exemplary embodiment three cameras are utilized to create two pairs of stereoscopic images suitable for stereoscopic viewing from two different perspectives.

For example, in this embodiment, a first common camera is utilized with a second camera to form a first stereoscopic image. For example, the first stereoscopic image may be projected in front of an operator, such as a dentist, and utilized by the operator during a dental procedure, for example. Additionally, in this embodiment, a third camera is utilized with the first, common camera to form a second stereoscopic image. For example, the second stereoscopic image may be projected in front of another individual, such as a dental assistant, and utilized by the same during a dental procedure, for example.

In one exemplary embodiment, the angle between a first stereoscopic perspective axis, i.e., an axis defined by the first and second cameras, and a second stereoscopic perspective axis, i.e., an axis defined by the first and third cameras, is approximately 90°. Advantageously, by creating an approximately 90° angle between the first stereoscopic perspective axis and the second stereoscopic perspective axis, the resulting first and second stereoscopic images have a point of view that is rotated by approximately 90°. This provides the dental assistant with an image that substantially corresponds to the dental assistant's perspective, i.e., an image that corresponds to the assistant's physical location relative to the operator.

In another exemplary embodiment, the present invention implements a computerized algorithm system to provide continuous synchronous tracking of the zoom function of each of the independent zoom lenses of the three cameras. In this exemplary embodiment, the zoom sensors of the cameras are connected to a computer controller that monitors and automatically adjusts the zoom factor so that it is consistent between all three independent cameras during the zooming process. In another embodiment, similar components of the multiple zoom lenses may be mechanically connected in such a way as to maintain a consistent zoom factor during operation. In another exemplary embodiment, a consistent zoom speed is generated by each camera and the zoom function is turned on and off simultaneously thereby producing a synchronized zoom speed for consistent magnification levels in all cameras.

Advantageously, as indicated above, by utilizing a common camera and creating two images rotated by a predetermined angle from one another, the image provided to both the operator and the assistant substantially replicate their respective views of a working environment, such as an oral cavity. Thus, neither the operator nor the assistant are forced to work from a stereoscopic image that is substantially rotated relative to their actual position. Further, by eliminating the ocular unit and various other components associated with a surgical microscope, the size of the stereoscopic device is reduced and the need to bend or otherwise crane to view the working environment through an ocular unit is eliminated.

Additionally, by replacing the ocular unit with the camera system described herein, a dental assistant is provided with the ability to view the working environment at the same point of focus as the operator without any concern of the operator unexpectedly moving the ocular unit, resulting in the ocular unit moving toward or away from the assistant's eyes.

In one exemplary embodiment, the present invention provides a stereoscopic visualization system for medical applications including: a first, common camera, a second camera, the second camera and the first, common camera defining a first axis; and a third camera, the third camera and the first, common camera defining a second axis, the first axis separated from the second axis by a perspective angle; wherein the first, common camera cooperates with the second camera to create a first stereoscopic image pair and cooperates with the third camera to create a second stereoscopic image pair.

In another form thereof, the present invention provides a stereoscopic visualization system for medical applications including: a first, common camera; a second camera, the second camera and the first, common camera cooperating to form a first stereoscopic image pair; a third camera, the third camera and the first, common camera cooperating to form a second stereoscopic image pair; an input device; and a controller electronically connected to each of the cameras and the input device, wherein input received by the controller from the input device results in the controller altering the function of at least one of the cameras.

In yet another form thereof, the present invention provides a method of creating a stereoscopic visualization system for medical applications, including: providing three cameras having a lens pack and an imager; realigning the imager with the lens pack to align the center of the imager with the center of the lens pack; aligning each of the three cameras to have a substantially similar focal point; and securing each of the three cameras in position.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 11 is a perspective view of a camera baseplate and objective lens holder according to an exemplary embodiment;

FIG. 12 is an exploded view of the objective lens holder of FIG. 11 in conjunction with a camera baseplate;

FIG. 21 is a perspective view of an operator's display system;

FIG. 22 is a side, schematic view of the operator's display system of FIG. 21;

FIG. 24 is a perspective view of another exemplary display system.

Corresponding reference characters indicate corresponding parts throughout the several views. The exemplifications set out herein illustrate preferred embodiments of the invention and such exemplifications are not to be construed as limiting the scope of the invention in any manner.

DETAILED DESCRIPTION

Figure 1:
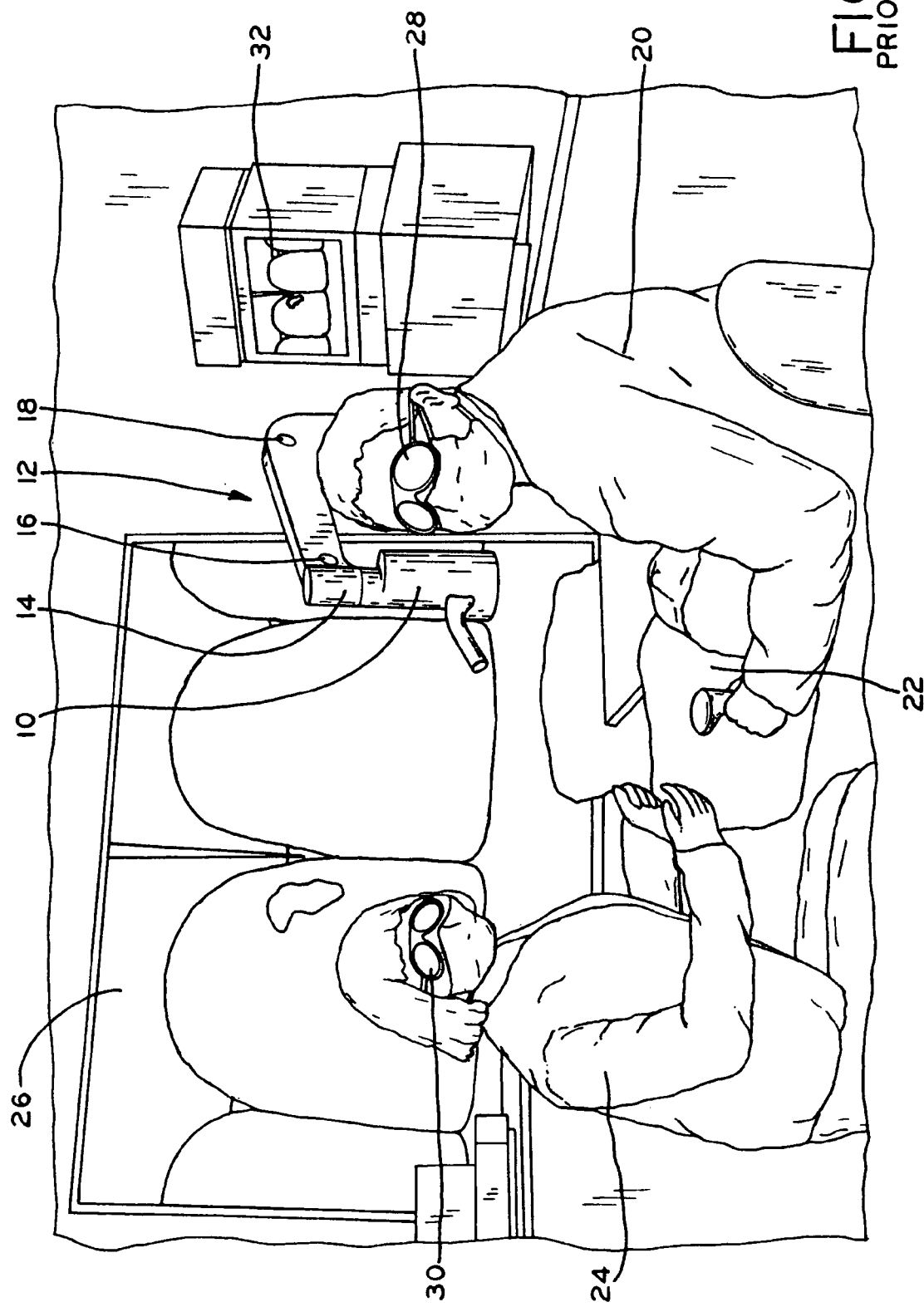
FIG. 1 is a perspective view of a microdentistry operating environment depicting a stereoscopic video system coupled to a surgical microscope.

Referring to FIG. 1, a microsurgery theater is shown depicting prior art stereomicroscope 10. The tubular unit of stereomicroscope 10, which forms the body of the microscope, is connected to stand 12 to provide for the movement of stereomicroscope 10 about a plurality of pivot points 14, 16, 18. For example, stand 12 may be a Model U microscope stand commercially available from Carl Zeiss. During a surgical procedure, light is received by stereomicroscope 10 through the tubular unit, which is connected to a video camera. The video camera receives the light transmitted through the tubular unit and then generates an image that is transmitted to a projector, for example. The projector projects the image generated by stereomicroscope 10 onto screen 26, which is positioned directly in front of dentist 20.

As shown, dentist 20 is positioned behind and above the head of patient 22. Dentist 20 may then work, e.g., perform a dental procedure, from the image on screen 26, which, with use of glasses 28, may provide a 3-D image of the operating field to dentist 20. In order for assistant 24 to effectively assist dentist 20, the stereoscopic image available on screen 26 is split to provide an image on monitor 32 for assistant 24. Assistant 24 utilizes glasses 30 to view a 3-D image on the display of monitor 32. In splitting the stereoscopic image to provide the same image that is viewed by dentist 20 to assistant 24, assistant 24 receives a stereoscopic image, i.e., image 32, with an incorrect angular perspective, i.e., the image does not correspond to the view of the patient's oral cavity from the assistant's working position. Specifically, the image that is provided to assistant 24 is rotated approximately 90 degrees relative to the assistant's actual working position.

To overcome this and other deficiencies of the prior art design, the camera system of the present invention may be utilized. While described and depicted herein with specific reference to dentists and dental procedures, the present invention may be used in any medical setting by any type of medical professional, such as a doctor or surgeon. Additionally, the system of the present invention may also be used in an industrial setting where magnification and/or stereoscopic visualization is beneficial to examine and/or perform work on various components.

Figure 2:
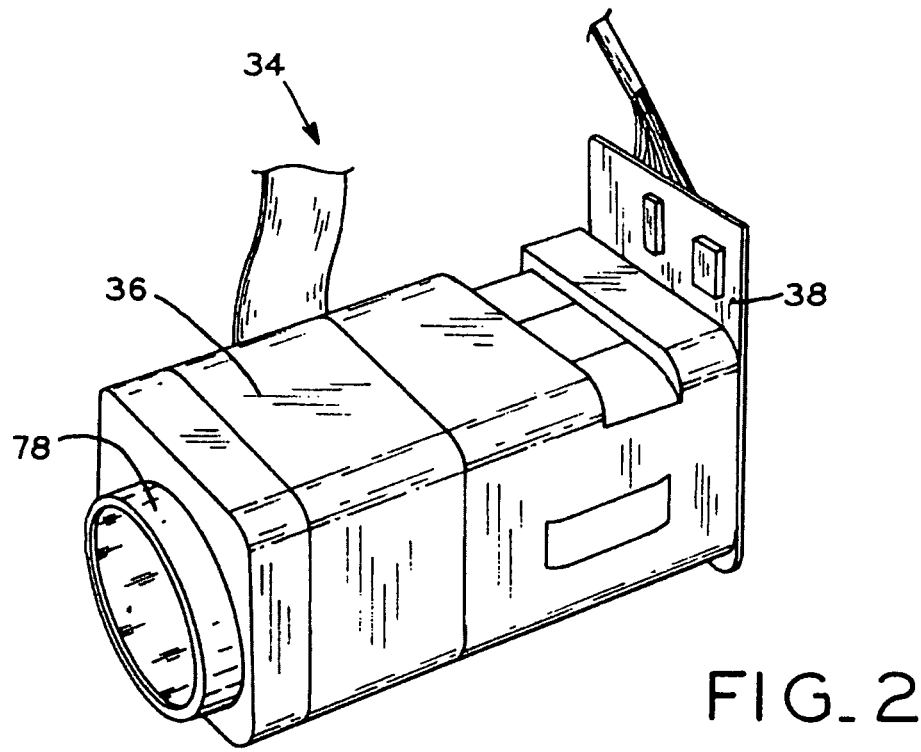
FIG. 2 is a perspective view of a lens pack and imager cooperating to form a camera in accordance with an exemplary embodiment.
Figure 3:
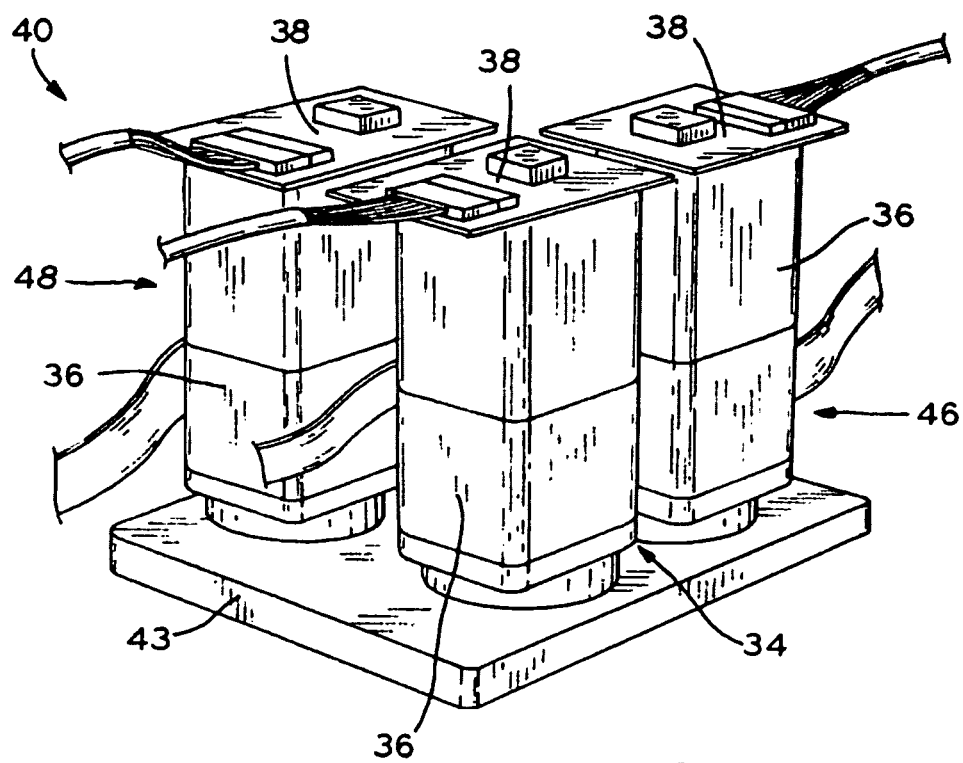
FIG. 3 is a perspective view of a plurality of cameras according to FIG. 2 assembled to form a camera system.
Figure 4:
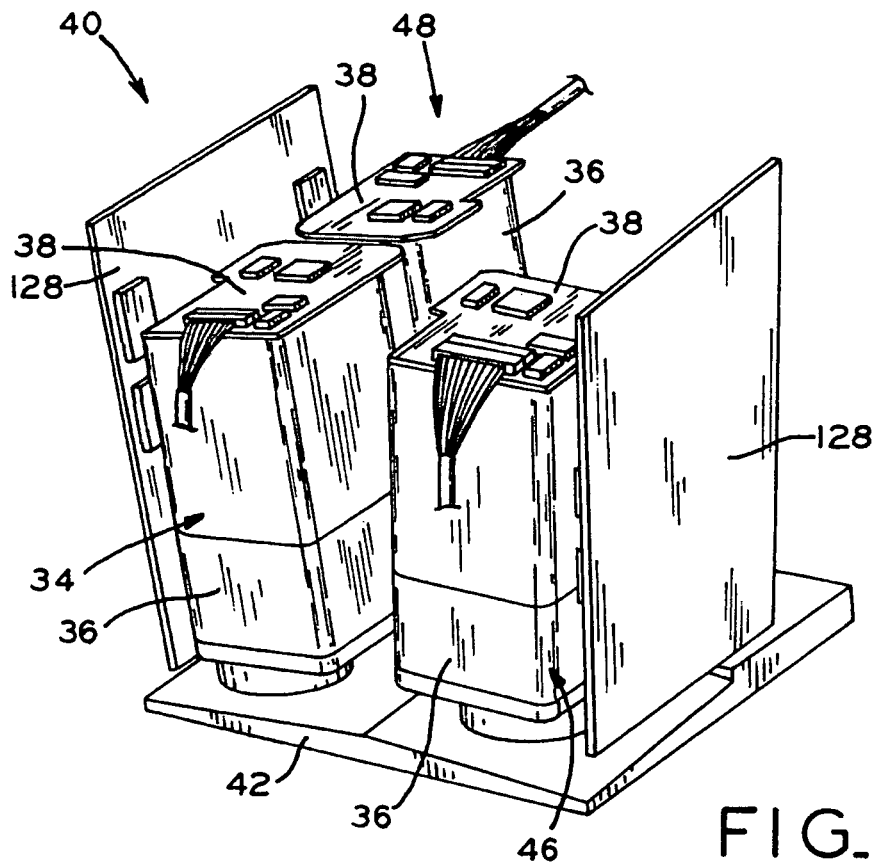
FIG. 4 is another perspective view of a plurality of cameras according to FIG. 2 assembled to form a camera system.

Referring to FIGS. 2-4, the camera system of the present invention includes three cameras 34, 46, 48, each of which includes lens pack 36 and imager 38. Cameras 34, 46, 48 may be obtained from any camera, such as model number HDR-HC3 commercially available from Sony Corporation or model numbers HV-20 and HV-30 commercially available from Canon, Inc. Advantageously, by utilizing consumer-grade cameras, such as those identified above, the overall cost of the system of the present invention is substantially reduced. Lens packs 36 include a series of lenses that direct light to imagers 38. In exemplary embodiments, lens packs 36 may be lens packs obtained from commercially available camcorder systems, as identified above, or may be a series of optics specifically manufactured for use with the present system. In one exemplary embodiment, lens packs 36 include an image stabilizing lens, e.g., a lens that has a predetermined amount of biased movement to dampen shocks and vibrations encountered by lens packs 36. Imagers 38 are positioned at the end of lens packs 36 and receives the light transmitted through lens packs 36. Imagers 38 then creates a series of electric signals that correspond to the intensity and wavelength of light passing through lens packs 36 and contacting discrete portions of imagers 38. For example, imagers 38 may employ a charged-coupled device ("CCD") or, alternatively, a complementary metal-oxide semiconductor ("CMOS").

In order to prepare cameras 34, 46, 48 for use in the camera system described in detail below, any image stabilizing lens contained within lens packs 36 must be secured in a fixed position. In one exemplary embodiment, the image stabilizing lens is secured in a fixed position with epoxy. Additionally, imagers 38 must be properly centered on lens packs 36 to prevent substantial amounts of "walking" that may render the image created by cameras 34, 46, 48 unusable to form a stereoscopic image. Walking is a phenomenon in which the position of an object in the frame of an image generated by cameras 34, 46, 48 moves within the frame as cameras 34, 46, 48 are zoomed in and out. While this type of walking has little effect on the quality of standard video, such walking in a stereoscopic system may cause the 3-D image to lose its clarity and may otherwise cause eye strain and fatigue.

To achieve the proper positioning of imagers 38 and substantially eliminate walking, imagers 38 are loosened from lens packs 36. Then, an image generated by the imager of one of cameras 34, 46, 48 is fed to a monitor, which displays the image. A test object is positioned below the camera being tested and forms a portion of the image created thereby. The camera being testing is then zoomed in on the test object and the test object is centered within the frame of the image. Next, the camera being tested is zoomed out. As this occurs, the portion of the test object that was previously at the center of the frame of the image may move, i.e., walk, relative to the center of the monitor. If this walking occurs to an unacceptable degree, imager 38 is repositioned and the test repeated. Specifically, imager 38 is repositioned by moving imager 38 in a direction substantially perpendicular to the longitudinal axis of lens pack 36 until walking is substantially eliminated. Once the movement of the test object in the frame of the image generated by the camera being tested remains sufficiently stationary during zooming of the camera, i.e., the walking is substantially eliminated, imager 38 is secured to lens pack 36. In one exemplary embodiment, imager 38 is secured to lens pack 36 with an epoxy. However, any adhesives or other types of fasteners may be used to secure imager 38 to lens pack 36. This process is then repeated until each of cameras 34, 46, 48 has been tested.

Referring to FIGS. 3, 4, 6, and 7, a camera system according to an exemplary embodiment of the present invention is depicted as system 40. As indicated above, system 40 includes a plurality of cameras 34, 46, 48, which are secured to camera baseplate 42 and set to focus at infinity. By utilizing cameras 34, 46, 48, a first stereoscopic image is generated utilizing common camera 34 and second camera 46 (FIG. 3). This first image may be projected onto a screen, such as screen 26 of FIG. 1, or transmitted to a display system, such as display system 50, described in detail below with reference to FIGS. 21 and 22, for use by dentist 20 in performing a dental procedure. Additionally, a second stereoscopic image is generated utilizing common camera 34 and third camera 48 (FIG. 3). This second stereoscopic image may be projected onto a screen, such as screen 26 of FIG. 1, or transmitted to a display system, such as display system 50, for use by assistant 24 during a dental procedure Referring to FIGS. 3,4, 6-10, camera baseplate 42 includes a plurality of apertures 52 aligned to substantially form an "L" shape. Due to the positions of cameras 34, 46, 48 on camera baseplate 42, the images created by the corresponding sets of cameras 34, 46 and cameras 34, 48 will be rotated by angle θ, shown in FIG. 6, i.e., the angular difference between axis $A_1$ defined by cameras 34, 46 and axis $A_2$ defined cameras 34, 48. As a result, assistant 24 is provided with a stereoscopic image that substantially replicates the operating field from the assistant's perspective, i.e., the perspective assistant 24 has when looking at the operating field without the assistance of system 40.

Figure 8:
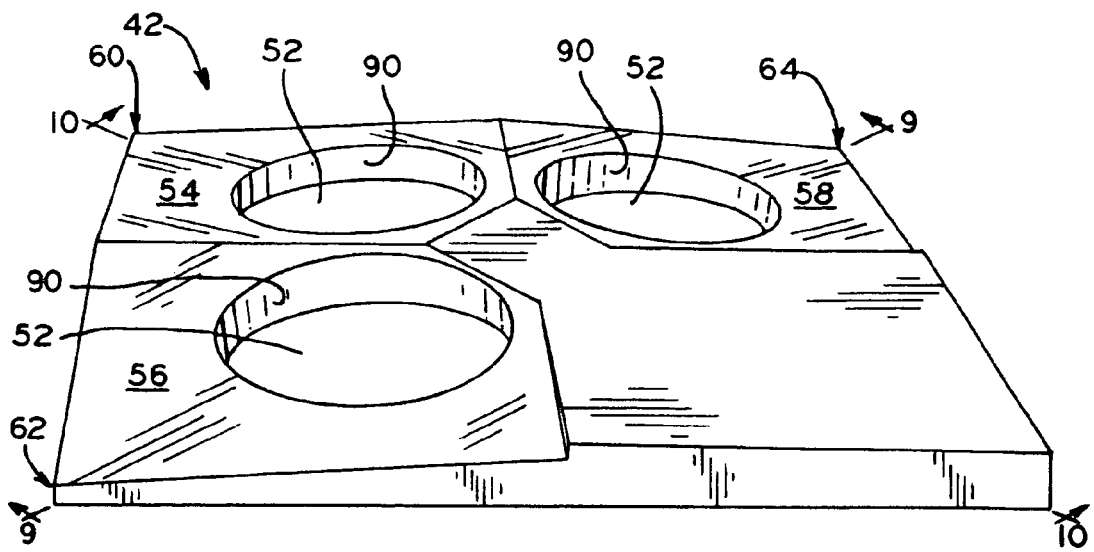
FIG. 8 is a perspective view of a camera baseplate.
Figure 9:
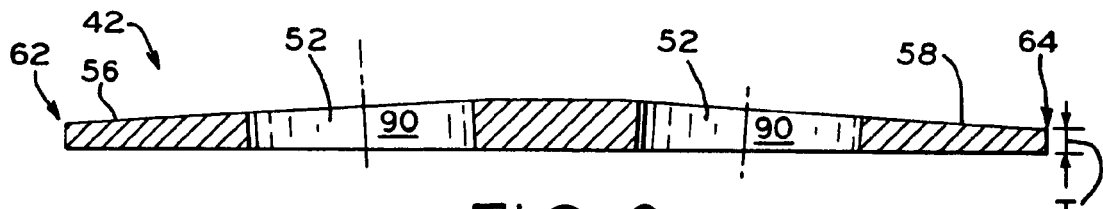
FIG. 9 is a cross sectional view of the camera baseplate of FIG. 8 taken along lines 9-9 of FIG. 8.
Figure 10:
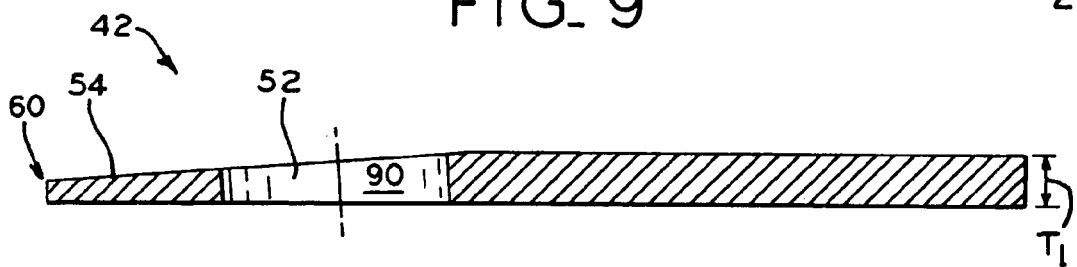
FIG. 10 is a cross sectional view of the camera baseplate of FIG. 8 taken along lines 10-10 of FIG. 8.

Referring to FIGS. 8-10, in one exemplary embodiment, camera baseplate 42 includes a plurality of surfaces 54, 56, 58 configured to receive cameras 34, 46, 48 thereon. Specifically, referring to FIGS. 9 and 10, surfaces 54, 56, 58 are inclined such that the portion of surfaces 54, 56, 58 nearest to the center of camera baseplate 42 has a thickness $T_1$ that is greater than thickness $T_2$ defined at comers 60, 62, 64 of surfaces 54, 56, 58, which also define three of the comers of camera baseplate 42. Stated another way, surfaces 54, 56, 58 are each inclined downwardly in the direction of comers 60, 62, 64 of surfaces 54, 56, 58, such that the thickness of camera baseplate 42 decreases in an outward direction along each of surfaces 54, 56, 58.

The inclination of surfaces 54, 56, 58 is set such that the center of lens packs 36 of each of cameras 34, 46, 48 is focused on substantially the same point at a predetermined distance from the bottom of camera baseplate 42. In one exemplary embodiment, the lens contained within lens packs 36 of each of cameras 34, 46, 48 are focused on substantially the same point approximately ten inches from the bottom of camera baseplate 42. Thus, the use of camera baseplate 42 provides for the gross alignment of lens packs 36 of each of cameras 34, 46, 48 and ensures that each of cameras 34, 46, 48 generates an image of substantially the same portion of a patient's oral cavity. This allows the images generated by cameras 34, 46, 48 to be used effectively to create stereoscopic images.

Figure 13:
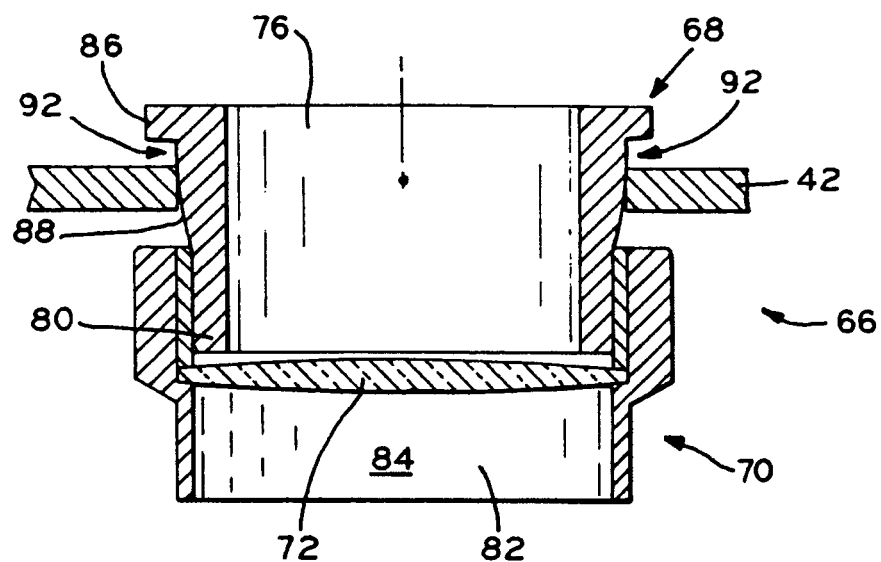
FIG. 13 is a cross sectional view of the objective lens holder of FIG. 11 taken along line 13-13 of FIG. 11.
Figure 14:
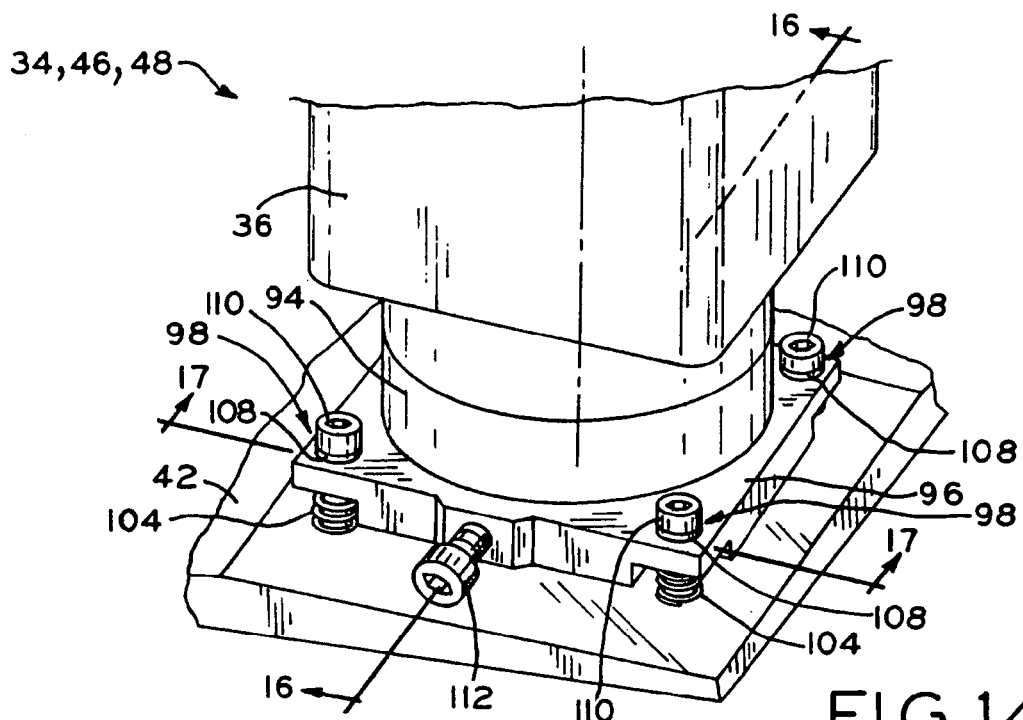
FIG. 14 is a perspective view of a camera attached to a camera adjustment plate which is attached to a camera baseplate according to an exemplary embodiment.
Figure 15:
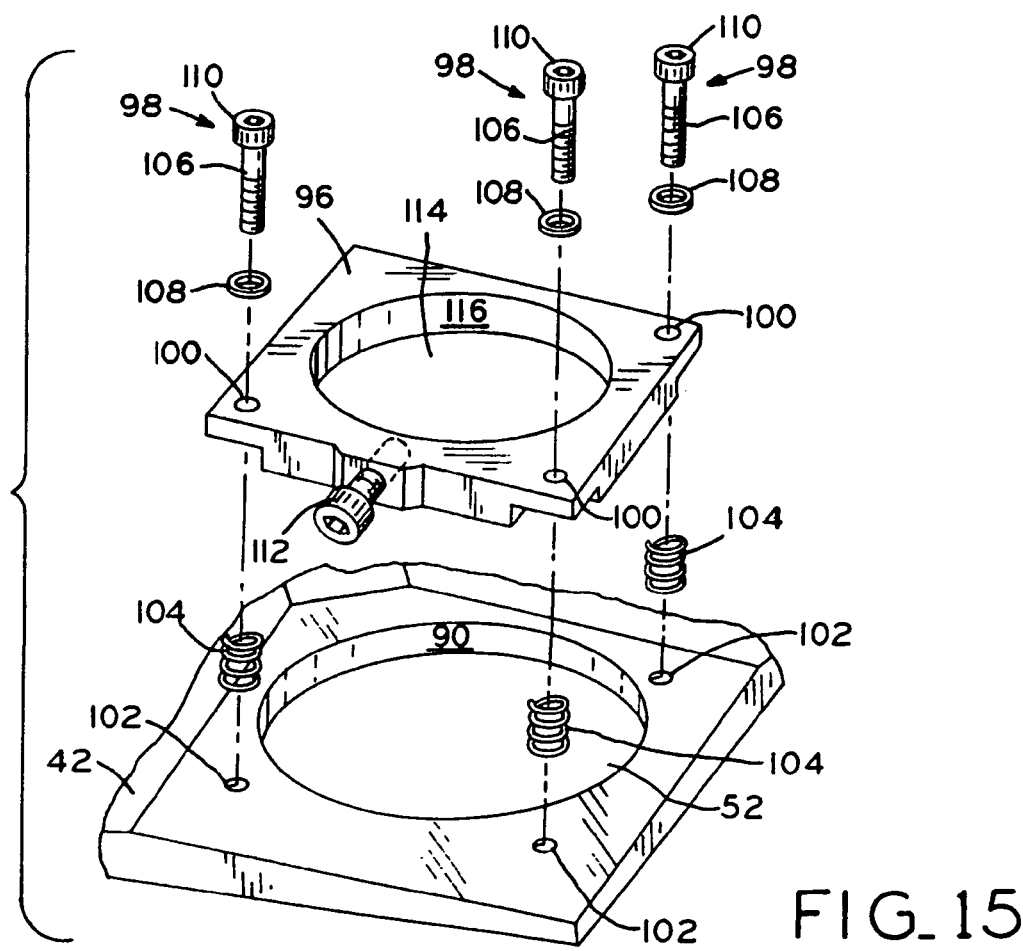
FIG. 15 is an exploded view of the camera adjustment plate and the camera baseplate of FIG. 14.
Figure 16:
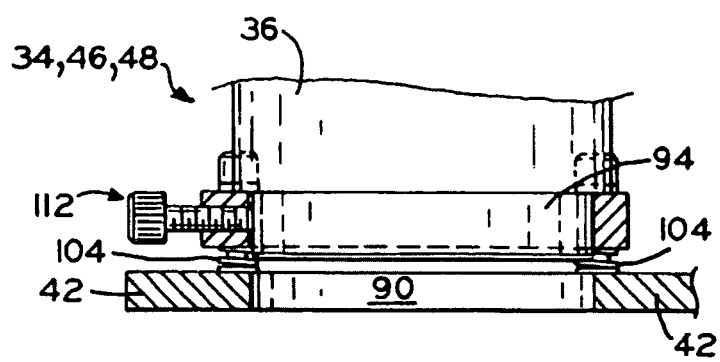
FIG. 16 is a cross sectional view of the camera, camera adjustment plate, and camera baseplate of FIG. 14 taken along line 16-16 of FIG. 14.
Figure 17:
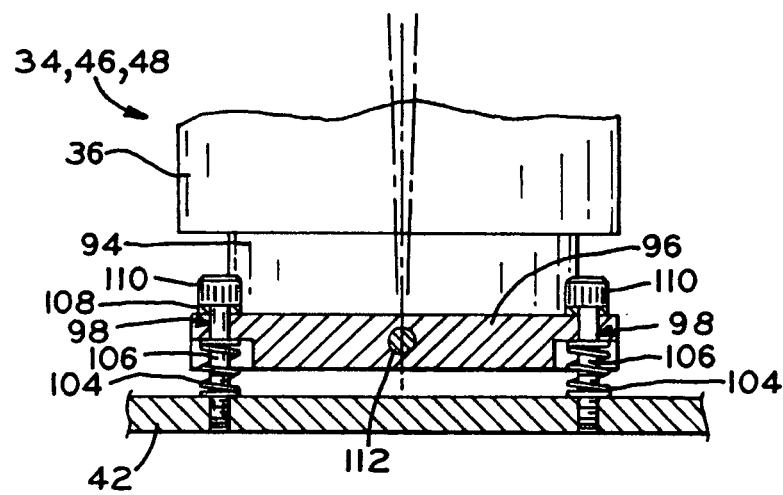
FIG. 17 is a cross sectional view of the camera, camera adjustment plate, and camera baseplate of FIG. 14 taken along line 17-17 of FIG. 14.

While camera baseplate 42 provides for the gross alignment of cameras 34, 46, 48, as described in detail above, fine alignment of cameras 34, 46, 48 may be necessary to generate stereoscopic images having improved clarity. Thus, referring to FIGS. 11-13, in order to facilitate fine alignment of cameras 34, 46, 48, objective lens assemblies 66 may be used. As shown in FIGS. 11-13, each of objective lens assemblies 66 include alignment portions 68 and mounting portions 70 having objective lenses 72 (FIG. 13) retained therein. Objective lenses 72 are provided to set the focal length of cameras 34, 46, 48 at a predetermined distance from camera baseplate 42. The focal length for the objective lens can vary and could be selected based on the intended application. For example, in an exemplary dental application, the focal length is substantially equal to ten inches from camera baseplate 42 when cameras 34, 46, 48 are focused at infinity. In other exemplary embodiments, such as those used in dental applications, the focal length may be a short as 8, 9, or 10 inches or as long as 12, 13, or 14 inches. In another exemplary embodiment, a variable focal length objective lens can be used. Additionally, since, in this embodiment, objective lenses 72 are used to fix the focal length of cameras 34, 46, 48, in order to focus cameras 34, 46, 48, cameras 34, 46, 48 must be physically moved in conjunction with one another to a distance from the object to be viewed that corresponds to the fixed focal length. To facilitate this movement, system 40 may be positioned within a housing, such as housing 74 (FIG. 20), and actuated as described in detail below.

Referring to FIGS. 11-13, bores 76 extend through alignment portions 68 and are sized to receive ends 78 (FIG. 2) of lens packs 36 therein. In one exemplary embodiment, the internal diameter of bores 76 is substantially similar to the outer diameter of ends 78. As a result, a friction fit is obtained between alignment portions 68 of objective lens assemblies 66 and ends 78 of lens packs 36. Once cameras 34, 46, 48 are secured to alignment portions 68, mounting portions 70 may be secured to alignment portions 68 to complete objective lens assemblies 66. Specifically, referring to FIG. 12, to secure alignment portions 68 and mounting portions 70 together to form objective lens assemblies 66, ends 80 of alignment portions 68 are inserted through apertures 52 in camera baseplate 42. Once received in apertures 52 of camera baseplate 42, ends 80 of alignment portions 68 are received within bores 82 in mounting portions 70. In one exemplary embodiment, ends 80 of alignment portions 74 are sized to form a friction fit with walls 84 defining bores 82 of mounting portions 70. Alignment portions 68 also include annular flanges 86 having diameters that are greater than the diameter of apertures 42 of camera baseplate 42. Thus, alignment portions 68 are prevented from passing through apertures 42.

Additionally, as shown in FIGS. 12 and 13, in one exemplary embodiment, alignment portions 68 include bulbous projections 88, each of which also have a diameter slightly greater than the diameter of apertures 52 of camera baseplate 42. Bulbous projections 88 allow of objective lens assemblies 66 and, correspondingly, cameras 34, 46, 48 to be adjusted within apertures 52 of camera baseplate 42. Specifically, due to the interaction of bulbous projections 80 with walls 90 defining apertures 52 in camera baseplate 42, objective lens assemblies 66 may be actuated polyaxially to increase and/or decrease the size of gap 92 (FIG. 13), formed between annular flanges 86 of alignment portions 68 and the upper surface of camera baseplate 42, at various positions around apertures 52. Once objective lens assemblies 66 and, correspondingly, cameras 34, 46, 48 are in their desired positions, objective lens assemblies 66 may be secured to camera baseplate 42 by an adhesive or any other known fastener. In one exemplary embodiment, objective lens assemblies 66 are secured to camera baseplate 42 by epoxy.

Alternatively, in another exemplary embodiment shown in FIGS. 14-17, fine adjustment of the alignment of cameras 34, 46, 48 is achieved by using objective lens assemblies 94 secured to cameras 34, 46, 48 and camera adjustment plates 96 secured to camera baseplate 42. Specifically, referring to FIG. 15, camera adjustment plates 96 are secured to camera baseplate 42 by a plurality of fasteners 98 extending through apertures 100 in camera adjustment plates 96 and threadingly engaging corresponding apertures 102 in camera baseplate 42. Spring washers 104 are captured between camera baseplate 42 and camera adjustment plates 96 on shafts 106 of fasteners 98. Additionally, flat washers 108 are positioned between heads 110 of fasteners 98 and camera adjustment plates 96. Threaded pins 112 extend through apertures in camera adjustment plates 96 and are used to secure cameras 34, 46, 48 in position, as described in detail below.

To secure cameras 34, 46, 48 to camera baseplate 42 and finely adjust the alignment of the same, fasteners 98 are advanced into apertures 102 in camera baseplate 42 until spring washers 104 are compressed to approximately fifty percent of their maximum compression. Cameras 34, 46, 48, having objective lens assemblies 94 secured to lens packs 36 thereof, are positioned within apertures 114 in camera adjustment plates 96. In one exemplary embodiment, objective lens assemblies 94 are substantially similar to alignment portions 68 of objective lens assemblies 66, except as described in detail below. Specifically, objective lens assemblies 94 have lenses (not shown), which are substantially similar to lenses 72 of mounting portions 70, positioned and retained therein to provide a fixed focal length to cameras 34, 46, 48. Thus, like lenses 72, these lenses are provided to set the focal length of cameras 34, 46, 48 at a predetermined distance. In one exemplary embodiment, the focal length is ten inches. Additionally, objective lens assemblies 94 lack bulbous projections 88. Instead, objective lens assemblies 94 have a substantially flat exterior surface to provide adequate clearance for adjustability with walls 116 defining apertures 114 in camera adjustment plates 96.

Once cameras 34, 46, 48 are positioned within apertures 114 of their respective camera adjustment plates 96, threaded pins 112 are advanced into apertures in camera adjustment plates 96 to contact objective lens assemblies 94 positioned on lens packs 36 of cameras 34, 46, 48. The interaction between the ends of threaded pins 112 and objective lens assemblies 94 secures cameras 34, 46, 48 in the desired rotational position relative to camera adjustment plates 96. Once cameras 34, 46, 48 are secured to camera adjustment plates 96, fine adjustment of the alignment of cameras 34, 46, 48 may be achieved by adjusting the position of fasteners 98. For example, any of fasteners 98 may be tightened, i.e., heads 110 of fasteners 98 may be advanced toward camera baseplate 42, or loosened, i.e, heads 110 of fasteners 98 may be advanced away from camera baseplate 42. Thus, if any of fasteners 98 are tightened, the corresponding spring washers 104 are compressed, causing camera adjustment plates 96 to move in a direction toward camera baseplate 42. Alternatively, if any of fasteners 98 are loosened, the corresponding spring washers 104 bias camera adjustment plates 96 upward, causing camera adjustment plates 96 to move in a direction away from camera baseplate 42. By adjusting the position of fasteners 98, the position of camera adjustment plates 96 and, correspondingly, cameras 34, 46, 48, may be altered to provide fine adjustment of the alignment of camera 34, 46, 48. Once fasteners 98 have been adjusted to position cameras 34, 46, 48 in their desired positions, fasteners 98 may be locked in position. For example, epoxy may be applied to fasteners 98 to lock fasteners 98 in position.

Figure 18:
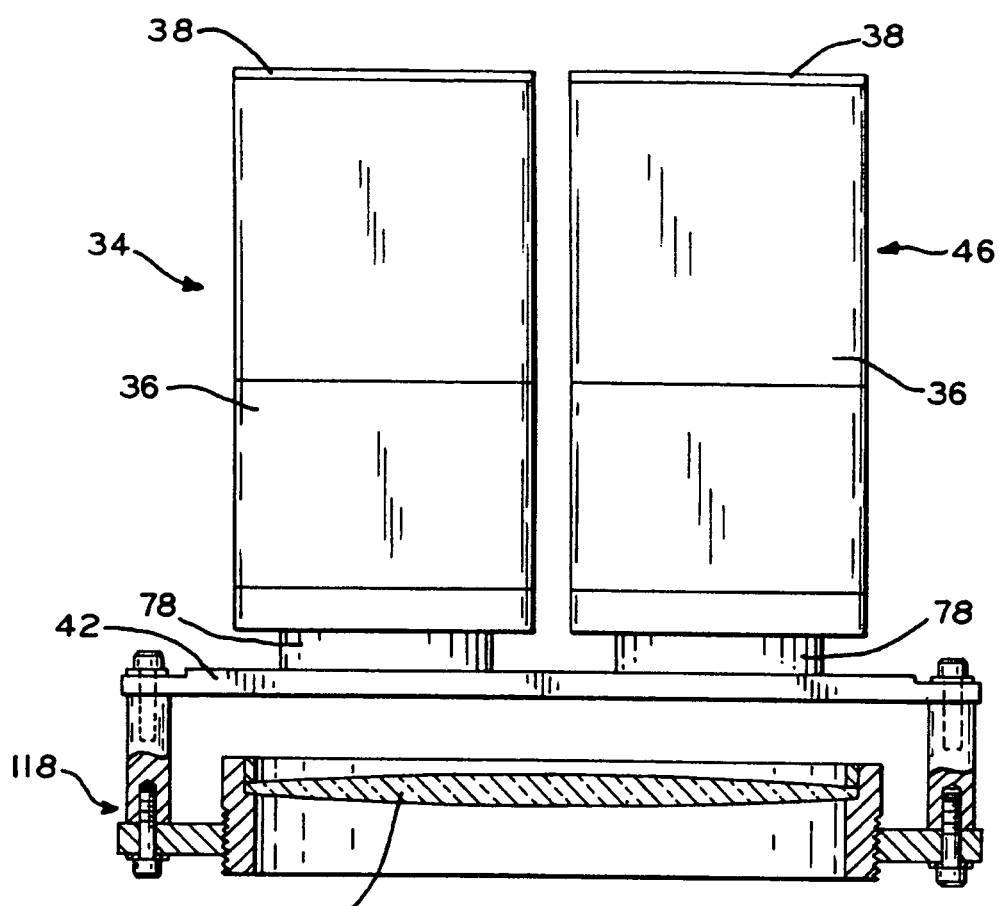
FIG. 18 is a cross sectional view of a common objective lens and holder attached to a flat camera baseplate and corresponding cameras according to another exemplary embodiment.
Figure 19:
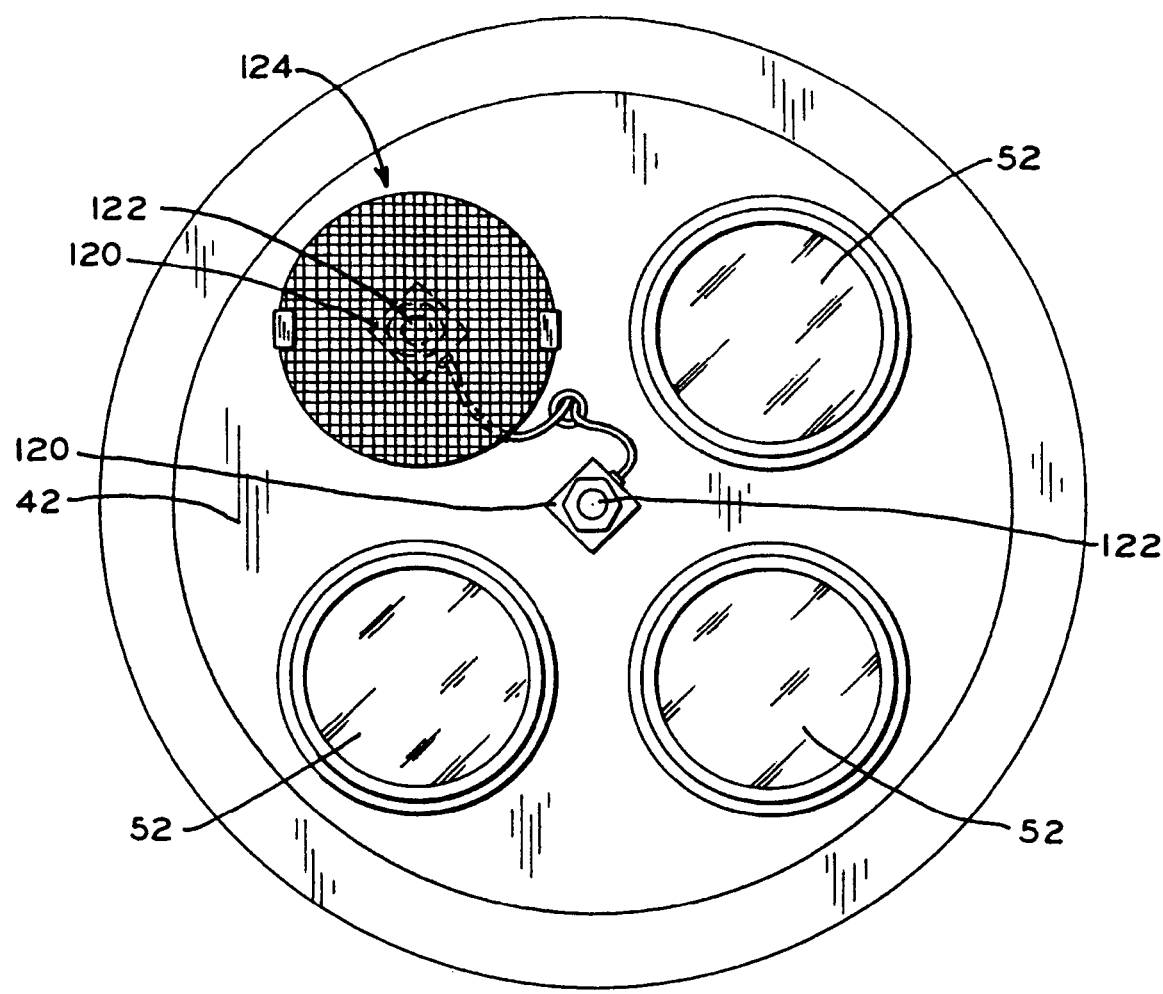
FIG. 19 is a plan view of the underside of a camera baseplate according to an exemplary embodiment.

Referring to FIG. 18, another exemplary embodiment of the camera system of the present invention is shown. In this embodiment, cameras 34, 46, 48 are secured to a flat camera baseplate 42 (FIG. 3) by positioning ends 78 of lens packs 36 of cameras 34, 46, 48 within apertures 52 of camera baseplate 42. Once in this position, cameras 34, 46, 48 are secured in any known manner. Once cameras 34, 46, 48 are secured to camera baseplate 42, common, objective lens 116 is positioned beneath camera baseplate 42. In one exemplary embodiment, common, objective lens 116 is an achromatic lens. Common, objective lens 116 is contained within casing 118, which is secured to the lower side of camera baseplate 42 to retain lens 116 in position. Thus, in this embodiment, an individual lens is not provided for each of cameras 34, 46, 48 and, instead, each of cameras 34, 46, 48 are focused through one common, objective lens 116. In one exemplary embodiment, the focus function for each of individual cameras 34, 46, 48 is set to a predetermined focal length that produces a sharp focus at the desired focal distance of the selected common objective lens 116. In one exemplary embodiment, the predetermined focal length is infinity. In another exemplary embodiment, the predetermined focal length is different than infinity. As a result of using objective lens 116 to focus cameras 34, 46, 48, objective lens 116 is moved relative to cameras 34, 46, 48, eliminating the need to physically move cameras 34, 46, 48 to adjust the focus of the same.

Irrespective of the lens/es used to focus cameras 34, 46, 48, LED illuminator arrays 120 may be secured to camera baseplate 42 to illuminate a working area. LED illuminator arrays 120 may include pluralities of LEDs 122 secured to bases or, alternatively, may be formed by a single LED 122. For example, LED illuminator arrays 120 may have from one to four LEDs 122 positioned thereon. LEDs 122 are utilized to provide a shadow free working environment. Additionally, lenses and diffusers 124 may be placed over some of the LED illuminator arrays 120 to control the light created by LEDs 122 and create a substantially even distribution of light over the working area.

In one exemplary embodiment, at least one of LEDs 122 has a wavelength substantially similar to or within the range of wavelengths needed to cure a light curing resin. Thus, by activating this LED 122, a dentist may cure a light curing resin that is applied within the oral cavity of a patient during a dental procedure. Additionally, the remaining LEDs 122 used in LED illuminator arrays 120 may be selected to have wavelengths substantially outside the wavelength range needed to cure the light curing resin. As a result, a dentist may use light curing resins without concern for their premature polymerization. Specifically, due to the controlled range of light wavelengths generated by the LEDs, light curable resins that polymerize as a result of exposure to light having wavelengths outside of this spectrum may be utilized for substantial periods of time without polymerization. Alternatively, instead of changing the wavelength of light generated by LEDs 122 in order to cure light curing resins, the intensity of light generated by LEDs 122 may be adjusted to cure light curing resins. Thus, in this embodiment, a first intensity of light may be used during general dental procedures and a second, higher intensity light may be used to effect the curing of a light curing resin. In this embodiment, all of the individual LEDs may be used for both the general dental procedure and may also be used to effect the curing of light curing resins.

Figure 23:
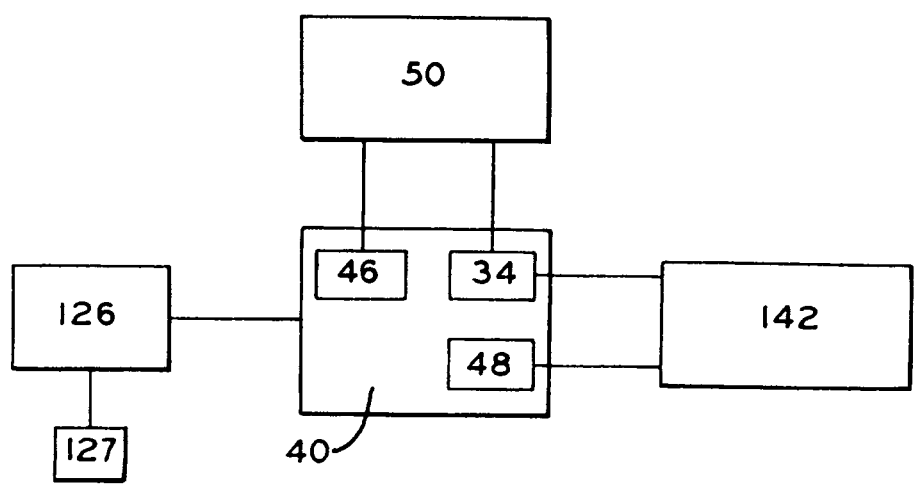
FIG. 23 is a schematic of various components used in connection with the camera system of the present invention.

Referring to FIG. 23, in order to control the operation of system 40, including cameras 34, 46, 48, system 40 may be connected to controller 126. In one exemplary embodiment, one component of controller 126 is a Digital Signal Processor, a microcontroller, or a microprocessor, such as those commercially available from Texas Instruments. Controller 126 may include a display mechanism, such as a monitor, as well as input device 127, such as a keyboard, keypad, mouse, or foot pedal, for viewing and inputting information to controller 126. Additionally, controller 126 may be programmed in a known manner to control various functions of cameras 34, 46, 48 by communicating with existing camera circuitry. For example, referring to FIG. 4, control circuitry 128 of cameras 34, 46, 48, is connected to controller 126 in a known manner. Controller 126 may then be used to access the functions of camera 34, 46, 48 that were provided by the manufacturer and/or to program the same. For example, by using controller 126, the zoom function and/or the focus function of cameras 34, 46, 48 may be controlled and/or programmed. Additionally, in one exemplary embodiment, controller 126 may be operated to control and/or program one of cameras 34, 46, 48 or, alternatively, may be used to control and/or program more than one of cameras 34, 46, 48 substantially simultaneously. Additionally, in one exemplary embodiment, controller 126 provides electrical power to cameras 34, 46, 48.

In one exemplary embodiment, controller 126 may also be programmed to limit the range of the zoom function of cameras 34, 46, 48. For example, by using consumer cameras to form system 40, vignetting, i.e., a reduction in an image's brightness and/or saturation at the edges of the image as compared to its center, may occur at the upper and lower ranges of the camera's zoom. Additionally, walking may also be increased at the upper and lower ranges of the zoom of cameras 34, 46, 48. Thus, to avoid vignetting and increased walking, the range of the zoom of cameras 34, 46, 48 may be limited by controller 126. In one exemplary embodiment, controller 126 is programmed to limit the zoom of cameras 34, 46, 48 to the upper one-half of the available optical zoom and the lower two-thirds of the available digital zoom. In other exemplary embodiments, controller 126 is programmed to limit the zoom function of cameras 34, 46, 48 to substantially 60, 65, 70, 75, 80, or 85 percent of the available zoom function of cameras 34, 46, 48.

Additionally, in one exemplary embodiment, controller 126 may be programmed to slow the speed at which cameras 34, 46, 48 zoom once a certain point of zoom is reached. For example, controller 126 may be programmed to slow the speed of the zoom function of cameras 34, 46, 48 when cameras 34, 46, 48 exceeded fifty percent of the maximum zoom function allowed by controller 126. In other exemplary embodiment, controller 126 may be programmed to slow the speed of zoom of cameras 34, 46, 48 when cameras 34, 46, 48 have exceeded 55, 60, 65, 70, 75, or 80 percent of the maximum zoom function allowed by controller 126.

Depending on the type of camera utilized in system 40, i.e., whether the camera has a fixed speed or a variable speed zoom, controller 126 may also utilize an algorithm to coordinate the rate of zoom between cameras 34, 46, 48. While the rate of zoom may not effect the image quality of a standard image, if one of the two cameras used to generate a stereoscopic image zooms at a rate different than the zoom rate of the other of the two cameras, the image may loose its stereoscopic properties, e.g., the images become blurred and an observer is no longer able to see the image in three dimensions. For example, if cameras 34, 46, 48 are obtained from model number HDR-HC3 camcorders, commercially available from Sony Corporation, controller 126 may utilize an algorithm, such as the algorithm set forth in Example 1 below, to coordinate the zoom of cameras 34, 46, 48 with one another. In one exemplary embodiment, the algorithm is used to track the movement of the zoom lenses within lens pack 36. For example, a Hall Effect sensor may be used to track the movement of the treads of a screw used to move the zoom lenses. Then, depending on the readings obtained from the Hall Effect sensor, the power provided to lens packs 36 is correspondingly altered to adjust the speed of the zoom function. In this manner, if it is determined that one of lens packs 36 of cameras 46, 48 is zooming at a different rate than camera 34, the power provided to lens pack 36 may be altered to bring the zoom of the one of cameras 46, 48 into alignment with the zoom of camera 34. Thus, by adjusting the power provided to each of cameras 34, 46, 48 continuous synchronous tracking of the zoom function of each of cameras 34, 46, 48 is provided.

Alternatively, if cameras 34, 46, 48 are obtained from model number HV-20 or HV-30 camcorders, commercially available from Canon, Inc., cameras 34, 46, 48 may zoom at substantially similar rates and an algorithm may not be needed. Instead, in this embodiment, controller 126 may be programmed to zoom each of cameras 34, 46, 48 to the programmed outer limit of the zoom function at start-up. Thus, once set to the same position, any subsequent zooming of cameras 34, 46, 48 will be substantially simultaneous between each of cameras 34, 46, 48.

Figure 20:
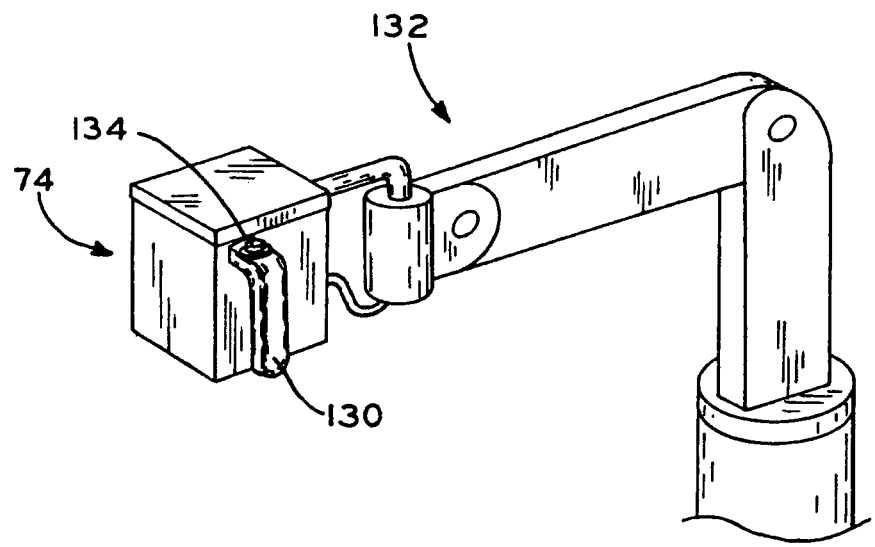
FIG. 20 is a perspective view of a housing containing a camera system connected to a stand.

Once camera system 40 is assembled, the entirety of camera system 40 may be positioned within housing 74, as shown in FIG. 20. Referring to FIG. 20, housing 74 includes handle 130 that facilitates movement and positioning of system 38. In one exemplary embodiment, housing 74 is secured to microscope stand 132, which is substantially similar to stand 12 of FIG. 1. As described in detail above, if lenses, such as objective lens assemblies 66, 94, are used to fix the focal length of cameras 34, 46, 48, cameras 34, 46, 48 may be programmed by controller 126 to set the focus of cameras 34, 46, 48 at infinity. Then, gross focusing of cameras 34, 46, 48 may be achieved by actuating handle 130 and, correspondingly, moving housing 74, which contains cameras 34, 46, 48 therein. Additionally, in one exemplary embodiment, fine adjustment of the focus of cameras 34, 46, 48 may be achieved by manual movement of housing 74.

In another exemplary embodiment, movement of housing 74 relative to stand 12 is achieved by electronic actuation. For example, housing 74 may connected to stand 12 by a series of motors in electronic communication with controller 126. In this embodiment, by actuating a foot pedal or other input device electronically connected to controller 126, a dentist may send an input to controller 126 requesting that housing 74 and, correspondingly, system 40 is moved toward the object to be viewed or away from the object to be viewed to adjust the focus of system 40 and camera 34, 46, 48.

In contrast, adjusting the position of system 40 relative to the object to be viewed in order to change the focus of the same is unnecessary if common, objective lens 116, described in detail above with specific reference to FIG. 18, is used. Specifically, in this embodiment, common, objective lens 116 may be actuated to adjust the focus of cameras 34, 46, 48. As a result, by moving lens 116 toward and away from camera baseplate 42, the focus of cameras 34, 46, 48 is correspondingly altered. In one exemplary embodiment, lens 116 is actuated within casing 118 to move toward and away from camera baseplate 42. For example, lens 116 may be threaded to a helicoil that, when rotated, causes lens 116 to move up and down along the helicoil. In one exemplary embodiment, a motor (not shown) is connected to casing 118 to facilitate movement of lens 116. In one exemplary embodiment, the motor is in electronic communication with controller 126. In this embodiment, by actuating a foot pedal or other input device electronically connected to controller 126, a dentist may send an input to controller 126 requesting that lens 116 is moved toward camera baseplate 42 or away from camera baseplate 42 to adjust the focus of system 40.

Additionally, in order to facilitate the proper focusing of system 40, handle 130 of housing 74 may include homing switch 134 positioned thereon. Homing switch 134 is electronically connected to controller 126 and, when depressed, sends an electronic signal to controller 126 that causes controller 126 to adjust the zoom function and/or the focus function of cameras 34, 46, 48. In one exemplary embodiment, depressing switch 134 results in controller 126 sending corresponding electronic signals to system 40 that sets system 40 at the mid-range of focus, i.e., positions lens 116 or housing 74 at substantially the midpoint between the maximum and minimum focus, and at the low end of the zoom, i.e., sets lens pack 36 at the lowest level of magnification allowed by controller 126. Thus, during use, if system 40 needs to be repositioned by a dentist to view another portion of a patient's oral cavity, the dentist may grasp handle 130 of housing 74 and depress homing switch 134 thereon. Then, when dentist 20 (FIG. 1) repositions system 40, the magnification and focus of the system are reset, allowing the dentist to easily center the object to be viewed within the frame of the image generated by system 40. Once in this position, the dentist may adjust the focus of system 40 and zoom in on the intended object. As a result, a dentist's inadvertent movement of the system under maximum zoom, which makes identification of a new object to be viewed within the patient's oral cavity difficult, is substantially avoided.

In addition to controller 126, system 40 may be connected to various audio and video equipment to facilitate the stereoscopic viewing and, if desired, recording of images and sounds captured by system 40. In one exemplary embodiment, system 40 is connected to audio and video equipment through controller 126 and/or additional hardware components. In another exemplary embodiment, system 40 is connected to audio and video equipment directly. For example, referring to FIGS. 21-24, system 40 may be connected to display systems 50, 142. In one exemplary embodiment, system 40 is connected to display systems 50, 142 by using an High-Definition Multimedia Interface (HDMI) connection provided on cameras 34, 46, 48, if available. Alternatively, system 40 may be connected to display systems 50, 142 using any of the connections provided on cameras 34, 46, 48 by the manufacturer.

Referring to FIGS. 21-23, display system 50, which is configured for viewing by an operator such as dentist 20 (FIG. 1), is shown. Display system 50 includes monitors 138, 140, aligned at a substantially ninety degree angle to one another.

Thus, to create a stereoscopic image pair for viewing by dentist 20, as described in detail below, common camera 34 is connected to one of monitors 138, 140 and second camera 46 is connected to the other of monitors 138, 140. Then, to create a stereoscopic image pair for an assistant that corresponds to the perspective of the assistant, i.e., is rotated approximate ninety degrees with respect to the dentist's perspective, as described in detail above, a second, display system 142, shown in FIGS. 23 and 24, is used. Second display system 142 is substantially similar to display system 50 and operates in substantially the same manner as display system 50, except as described in detail below. Specifically, referring to second display system 142, to create a second stereoscopic image pair for an assistant, common camera 34 is connected to one of monitors 150, 152 of second display system 142 and third camera 48 is connected to the other one of monitors 150, 152 of second display system 142.

In one exemplary embodiment, monitors 138, 140 of display system 50 and monitors 150, 152 of second display system 142 are Liquid Crystal Displays ("LCD") that are polarized vertically. However, in order to create a stereoscopic image, the present system alters the images to create a first image for the right eye having a first polarization and a second image for the left eye having a second polarization that is different than the first polarization. In one exemplary embodiment, the first polarization and the second polarization are separated by substantially ninety degrees. Then, by using correspondingly polarized glasses, i.e., glasses with a right lens polarized to correspond to the first polarization and a left lens polarized to correspond to the second polarization, a viewer can see the images generated by display systems 50, 142 stereoscopically in three dimensions.

In order to create images that are polarized at different angles from one another, polarizing film is used. In one exemplary embodiment, the present system creates images that are polarized ninety degrees apart from one another. However, any varying degree of polarization capable of producing stereoscopic images may be used. Referring specifically to display system 50, in one exemplary embodiment, in order to achieve the desired polarization, a sheet of polarizing film 144 is secured to the surface of monitors 138, 140 at plus forty-five degrees relative to the vertical axis of monitors 138, 140.

Beam splitter 148 is positioned between monitors 138, 140 at a substantially forty-five degree angle relative to monitors 138, 140. Beam splitter 148 allows approximately 50% of the light from monitor 138, shown generically as arrow A, to pass through beam splitter 148, and reflects approximately 50% of the light from monitor 140, shown generically as arrow B, toward a viewer positioned in front of monitors 138, 140 of stereoscopic display system 50. As a result of using beam splitter 148, the light from monitor 138, which is polarized at plus forty-five degrees, passes through beam splitter 148 maintaining the same polarization, i.e., remains polarized at a plus forty-five degree angle. In contrast, the light from monitor 140, which is polarized at plus forty-five degrees, is reflected by beam splitter 148 and the polarization is mirrored or rotated by ninety degrees, such that it is seen by the viewer as being polarized at minus forty-five degrees. Thus, the light from monitors 138, 140 arrives at a viewer having an effective polarization of plus forty-five degrees and minus forty-five degrees, resulting in a difference in the polarization of the light of ninety degrees between the viewer's two eyes.

Additionally, as a result of using beam splitter 148 and the subsequent reflection of light from monitor 140, the image displayed on monitor 140 must be flipped vertically, i.e., inverted. This allowed for the image from monitor 140 reflected to beam splitter 148 to have the same orientation as the image from monitor 138 that passed through beam splitter 148. In one exemplary embodiment, inversion of the image displayed on monitor 140 is achieved substantially simultaneously as the image is displayed, e.g., no external electronic processing of the image occurs. In one exemplary embodiment, the substantially simultaneous inversion and display of the image is achieved using the "Picture Flip" function available on certain commercially available LCD display models. For example, inversion of an image substantially simultaneously as the image is display may be achieved by using a model number LC-37D6U AQUOS LCD monitor commercially available from Sharp Corporation. Advantageously, by eliminating external electronic processing of the image displayed on monitor 140, the image transmitted to monitor 140 by one of cameras 34, 46, as described above, is displayed in real-time. This allows for system 40 to accurately create a stereoscopic image pair and also allows for system 40 to be used in medical and dental settings as a working instrument, e.g., an operating microscope, where the real-time display of images is desired.

Figure 5:
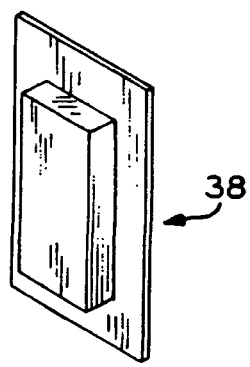
FIG. 5 is a perspective view of the imager of FIG. 2.
Figure 6:
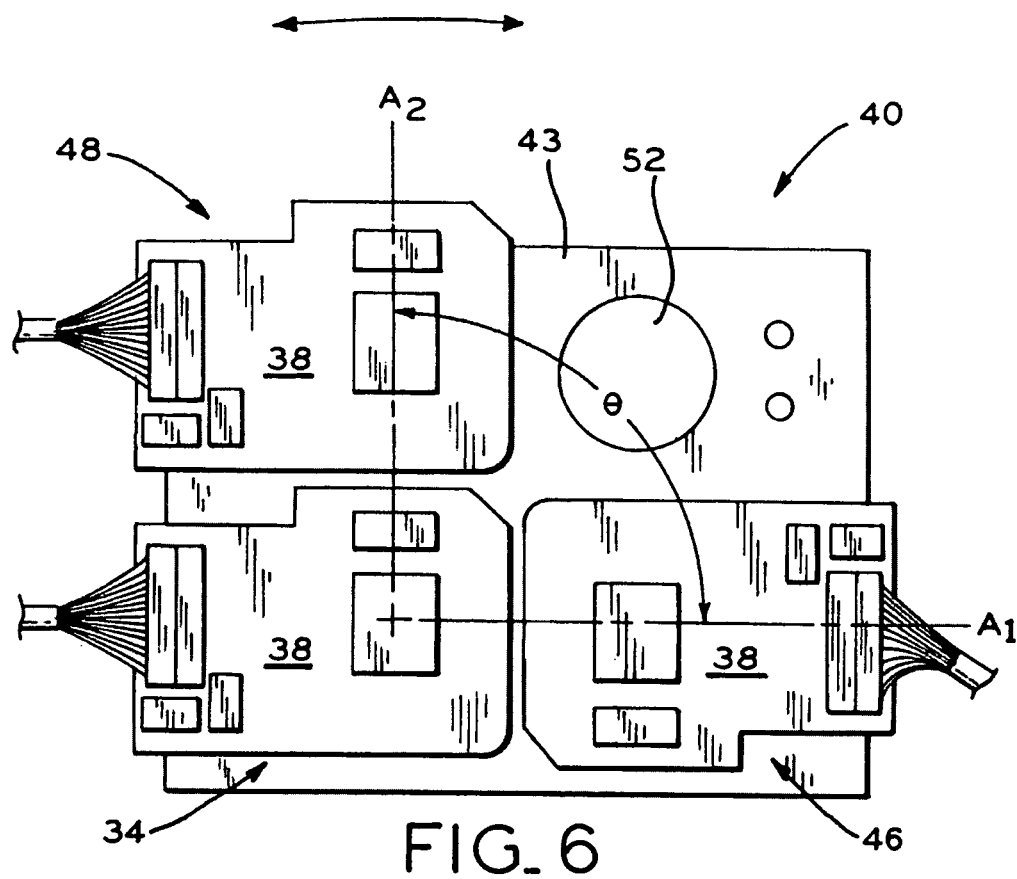
FIG. 6 is a plan view of the camera system of FIG. 4.
Figure 7:
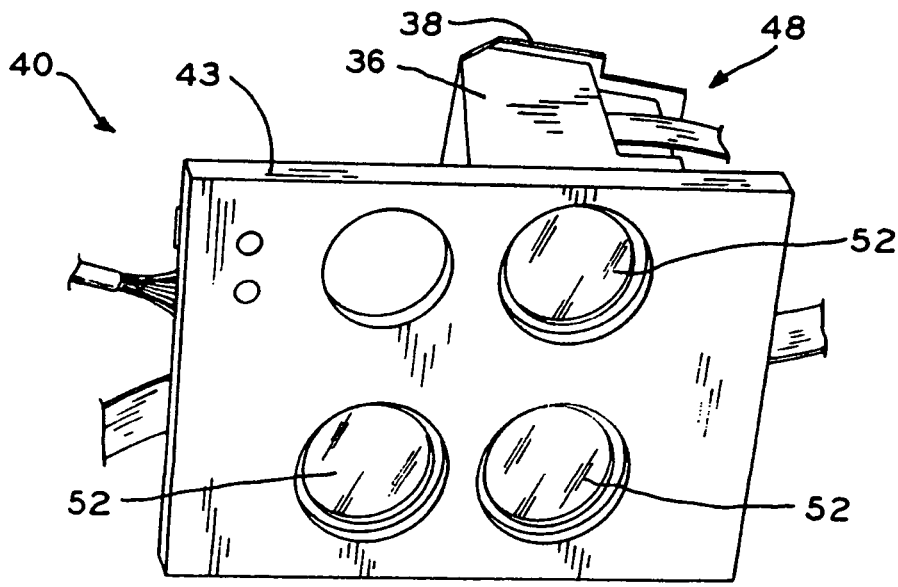
FIG. 7 is a perspective view of the camera system of FIG. 4.

Second display system 142, which is used to generate a stereoscopic image pair for an assistant as described in detail above, is configured to operate in a substantially similar manner as display system 50 and identical reference numerals have been used to identify corresponding parts therebetween. However, unlike display system 50, which is positioned in a landscape orientation as shown in FIG. 21, display system 142 is positioned in a portrait orientation as shown in FIG. 24. These orientations of display systems 50, 142 correspond to the orientation of imagers 38 (FIG. 5) of cameras 34, 46, 48. Specifically, cameras 34, 46, 48 have an aspect ratio, e.g., 16:9, that results in one of the dimensions of the image generated by cameras 34, 46, 48 being greater than the other of the dimensions of the same image.

For example, cameras 34, 46, 48 may have an aspect ratio of 4:3 or 16:9, both of which result in cameras 34, 46, 48 generating an image in which the width of the image is greater than the height of the image. Additionally, in one exemplary embodiment, the cameras are oriented so that the width of the image, i.e., the longest dimension of the image, extends in a horizontal direction from the perspective of the dentist. Thus, cameras 34, 46, as shown schematically in FIG. 23, are positioned in a corresponding orientation. As a result of this, cameras 34, 48 are positioned in an orientation in which the longest dimension of the image is formed to extend in a vertical direction from the perspective of the assistant, as shown schematically in FIG. 23. Thus, in order to properly display the images captured from camera 34, 48 on monitors 150, 152 of second display system 142, second display system 142 is positioned to have a portrait orientation. This provides the assistant with an identical field of view as that of the dentist with an orientation that matches the assistant's perspective and eliminates the need to crop, scale, or otherwise modify the images displayed on monitors 150, 152, which may cause a time delay in the display of the stereoscopic image that is intended for use in real time.

In addition to the display system described in detail above, system 40 may also be connected to an audio system to recreate and/or record the audio captured by system 40. Specifically, camera 34, 46, 48 are, in one exemplary embodiment, consumer cameras that include a microphone. Additionally, in other exemplary embodiment in which cameras 34, 46, 48 lack a microphone, a microphone may be added to system 40. By connecting cameras 34, 46, 48 to a stereo receiver and/or speakers, such as by using the connections provided by the manufacturer of cameras 34, 46, 48 or any other known audio connection methods, the sound captured by the microphone/s may be recorded in conjunction with the corresponding video. Advantageously, by capturing audio from a dental procedure, for example, a complete record of the procedure is available for review, as well as for training or instructional purposes. Additionally, audio details provide significant value to dentist and other medical professionals who can glean details regarding a specific procedure by the sound of the operation of instruments utilized during the performance of the same. Moreover, sound is considered to be the fifth dimension in many teaching models.

Further, in one exemplary embodiment, system 40 may be connected to standard devices to record the stereoscopic or monoscopic images and/or sounds captured by system 40. In one exemplary embodiment, system 40 is connected to a computer and the images and sounds are recorded to the hard disc drive thereof. In another exemplary embodiment, system 40 is connected to a stand-alone digital video recorder to record the stereoscopic or monoscopic images and sounds captured by system 40. Additionally, as identified above, system 40 may include high-definition cameras that allow for images captured and recorded to have a resolution of 1920× 1080. This provides the dentist or other users of system 40 with superb quality, high-definition images.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A stereoscopic visualization system of a common object for medical, dental, and industrial applications comprising:
    a first, common camera;
    a second camera, said second camera and said first, common camera defining a first axis which corresponds to a first viewing direction of the common object;
    a third camera, said third camera and said first, common camera defining a second axis which corresponds to a second viewing direction of the common object, said first axis separated from the second axis by a perspective angle; wherein said first, common camera cooperates with the second camera to create a first stereoscopic image pair and cooperates with the third camera to create a second stereoscopic image pair, wherein the first, common camera, the second camera and the third camera are positioned to ensure that the first stereoscopic image pair and the second stereoscopic image pair are of a same portion of the common object;
    a first display system which displays the first stereoscopic image pair; and
    a second display system which displays the second stereoscopic image pair, wherein the first, common camera, the second camera, and the third camera each generates an image of the common object, the first stereoscopic image pair includes the common object, the second stereoscopic image pair includes the common object, the common object having a first orientation in the first stereoscopic image pair displayed by the first display system and a second orientation in the second stereoscopic image pair displayed by the second display system, the second orientation being rotated relative to the first orientation by the perspective angle.

2. The system of claim 1, wherein said perspective angle is substantially equal to ninety degrees.

3. The system of claim 1, wherein said first display system has a substantially landscape orientation and said second display system has a substantially portrait orientation.

4. The system of claim 1, wherein each of said cameras further comprises a zoom function, wherein the power provided to each of said cameras is adjusted to provide continuous synchronous tracking of said zoom function of each of said cameras.

5. The system of claim 1, wherein each of said cameras further comprises a zoom function, said zoom function of each of said cameras configured to operate at a substantially similar speed relative to each other, whereby, when said zoom function is activated, said zoom function of each of said cameras is altered by a substantially equal amount.

6. The system of claim 1, further comprising a controller connected to an input device, said controller electronically connected to each of said cameras, wherein input received by said controller from said input device results in corresponding alteration of a function of at least one of said cameras.

7. The system of claim 6, wherein said input device comprises a foot switch.

8. The system of claim 1, further comprising a housing having a handle, wherein each of said cameras is positioned substantially entirely within said housing, said handle having a switch positioned thereon, said switch connected to a controller, whereby actuation of said switch results in the alteration of at least one function of at least one of said cameras.

9. The system of claim 1, further comprising a camera baseplate having a thickness, said camera baseplate having a plurality of surfaces configured to receive said cameras thereon, said thickness of said camera baseplate decreasing in an outward direction along each of said plurality of surfaces.

10. The system of claim1, wherein the first display system includes a first monitor connected to said first, common camera and a second monitor connected to said second camera.

11. The system of claim 1, the second display system includes a first monitor connected to said first, common camera and a second monitor connected to said third camera.

12. The system of claim 1, wherein each of said cameras further comprises a zoom function having a maximum zoom range, said controller programmed to limit said zoom function of each of said cameras to a restricted zoom range that is less than the maximum zoom range.

13. The system of claim 1, wherein the first, common camera, the second camera, and the third camera are focused on a common point.

14. The system of claim 1, wherein the common object is a portion of an oral cavity.

* * * * *

UNITED STATES PATENT AND TRADEMARK OFFICE
CERTIFICATE OF CORRECTION

| | | |
|---|---|---|
| PATENT NO. | : 8,619,127 B2 | Page 1 of 1 |
| APPLICATION NO. | : 12/119027 | |
| DATED | : December 31, 2013 | |
| INVENTOR(S) | : Assad F. Mora et al. | |

It is certified that error appears in the above-identified patent and that said Letters Patent is hereby corrected as shown below:

In the Claims:

Claim 11, Column 16, Line 45, after "claim 1," insert --wherein--

Signed and Sealed this
Thirteenth Day of May, 2014

Michelle K. Lee
*Deputy Director of the United States Patent and Trademark Office*